United States Patent [19]

Rosen

[11] Patent Number: 4,972,480

[45] Date of Patent: Nov. 20, 1990

[54] HOLOGRAPHIC COMMUNICATIONS DEVICE AND METHOD

[75] Inventor: Lowell Rosen, La Jolla, Calif.

[73] Assignee: General Dynamics (Space Systems Division), San Diego, Calif.

[21] Appl. No.: 463,100

[22] Filed: Jan. 10, 1990

[51] Int. Cl.$^5$ .............................................. H04L 9/00
[52] U.S. Cl. ........................................ 380/46; 380/28; 380/13; 455/26.1
[58] Field of Search ....................... 380/28, 46, 13, 38; 455/26, 28

[56] References Cited

U.S. PATENT DOCUMENTS

| | | | |
|---|---|---|---|
| 3,959,592 | 5/1976 | Ehrat | 380/48 |
| 4,052,565 | 10/1977 | Baxter et al. | 380/28 |
| 4,694,467 | 9/1987 | Mui | 380/34 |
| 4,817,141 | 3/1989 | Taguchi | 380/38 |
| 4,852,166 | 7/1989 | Masson | 380/46 |

Primary Examiner—Thomas H. Tarcza
Assistant Examiner—David Cain
Attorney, Agent, or Firm—Henri J. A. Charmasson

[57] ABSTRACT

A holographic device and method encrypts a time dependent data signal, s(t), by a complex time dependent phase shifting signal. This produces a new signal whose modulus is equal the absolute value of the data signal, s(t), but has widely spread the frequency of the data signal. This new complex signal is mathematically transformed, producing an amplitude and phase spectrum (or a real and imaginary transform spectrum) of signal components. The amplitude and phase signals are modulated into a radio frequency carrier (or some other radiating source) as quadrature components and transmitted. At the receiver, the quadrature signals are separated into an amplitude and phase components which are then mathematically inverse transformed. The result is a complex signal with a real and imaginary components. The resulting signal is an accurate representation of the original data signal if a complete signal is recovered. If only a portion of the frequencies transmitted are recovered, the modulus is still represents the data signal, but may have artifacts frequencies in the signal. The modulus may then be filtered to remove these artifact frequencies, recovering the reconstructed data signal.

21 Claims, 5 Drawing Sheets

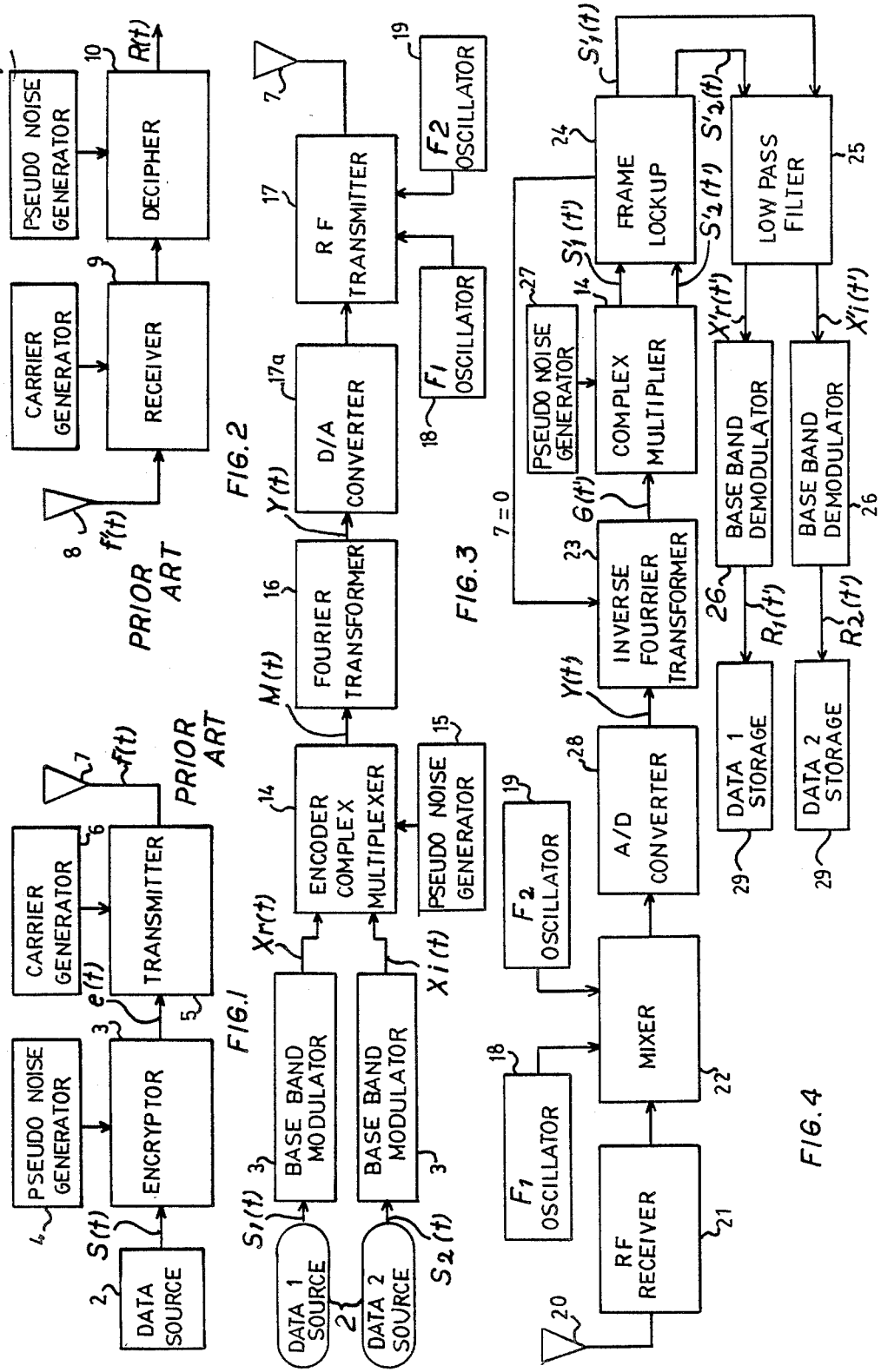

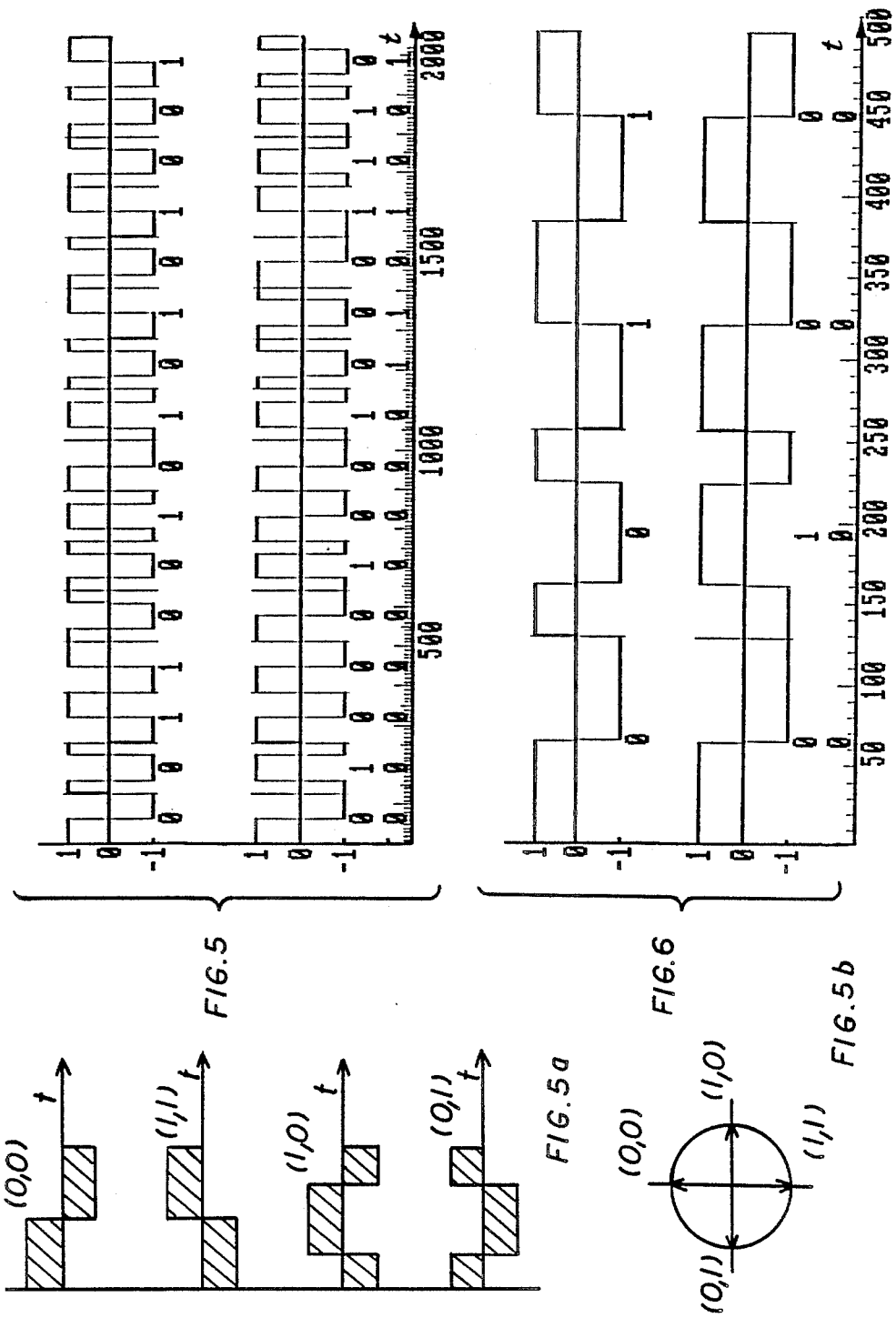

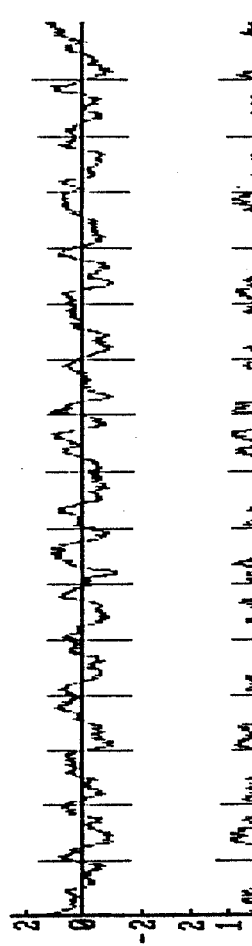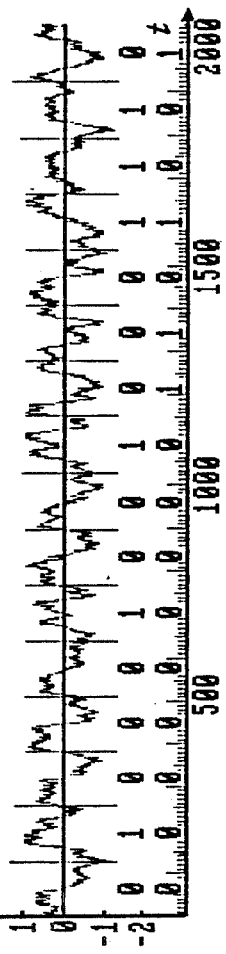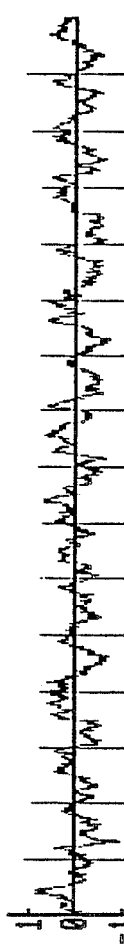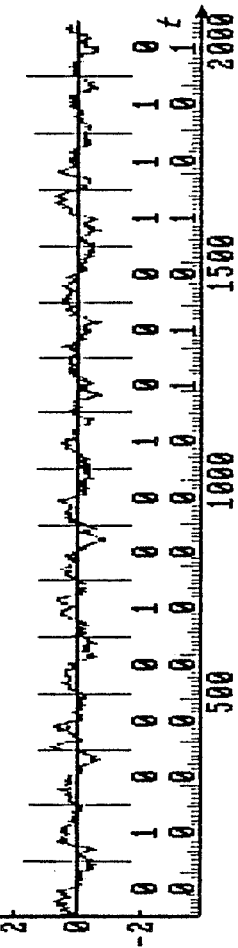
FIG.11                FIG.12

HOLOGRAPHIC COMMUNICATIONS DEVICE AND METHOD

FIELD OF THE INVENTION

This invention relates to communications, specifically to secure and covert modulated radio frequency carrier wave communications systems. The invention specifically relates to methods designed to produce aperiodic transmissions having the characteristics of random noise and a high degree of information redundancy.

BACKGROUND OF THE INVENTION

The primary components of a modulated carrier wave communications system are (1) modulation of a carrier frequency signal with a data signal, (2) transmission of the modulated signal from one location, (3) reception of the modulated signal at a second location, and (4) demodulation and recovery of the data signal. This basic system must be modified when secure and covert communications are required.

When secure communications (difficult for others monitoring the communications to determine the encrypted data signal) are required, further encoding (typically of pseudo-noise) is also accomplished. In order to decode a pseudo-noise encoded signal, the recipient must have the same encoded pseudo-noise to subtract it from the received signal. The pseudo-noise (signals that appear to have noise-like properties) is combined with the data signal, typically by an "exclusive or" operation. This spreads the spectrum of the modulated signal from a narrow carrier band to a wide (noise-like) spectrum. The embedded carrier signal must not be easily distinguishable from the pseudo-noise signal to prevent its unauthorized capture. The transmitted signal (combination of pseudo-noise and data signal) must appear to be noise to others monitoring the communications. The decoding process essentially lines up by phase comparison or synchronization the received noise-like signal with the pseudo-noise coding, revealing the original data signal as differences between signal and pseudo-noise code "words".

For military applications, secure transmissions must be able to meet other requirements, such as covertness while making it difficult for others to recognize the transmission as communications and to decode it. Although absolute protection against interception and decoding is not possible, a low probability of intercepting (LPI) and decoding is desired. This has required periodic alteration of pseudo-noise code "words" so that its repetition does not reveal it. The possibility of either continuous or periodic jamming, with broad spectrum or narrow band signals must also be considered.

These military requirements have resulted in pulsed transmissions or "burst" transmissions (to minimize time to detect or jam) with variable pseudo-noise code "words". The receiver detects when pulsed signals are being transmitted, turns on, determines the end of the complete transmission, determines the currently valid code "word", and synchronizes the valid code "word" with the received signal to extract the data signal. This process typically takes a few seconds to several minutes to accomplish.

These military processes and communications equipment also have other objectives. The equipment should be small so that it may be camouflaged, not be an obvious target or interfere with other operations. It should also be light weight, rugged in construction, easily operated and low in cost. When the equipment is used in each of the two modes (transmitting and receiving), a minimum of effort to convert from one mode to another mode is also desirable.

Current military or other LPI/secure communications equipment and methods may accomplish some of these objectives well, but others poorly. The signal detection, pulsing, variable encoding and decoding equipment tends to be complex and cumbersome, limiting transport and use. However, the most serious limitations are primarily related to the need to transmit, receive and synchronize a complete signal over the wide (spread) spectrum of pseudo noise frequencies. The transmitter and receiver must be able to perform well over this wide range of spread frequencies as the received signal must be synchronized against a copy of the complete pseudo-noise signal to reveal the data signal. Data can be lost due to poor receiver response time, cross signal interference, enemy jamming, and delays due to synchronization requirements. Some of these limitations can be partially overcome with redundant signal transmissions (multiple pulses with different pseudo-noise "words" producing a different spectrum of frequencies), but this again requires variation of code "words" and the attendant increase in transmitter and receiver system complexity and unreliability.

The greatest limitation of current LPI technology relates to this inherent lack of covertness. All use some kind of periodic transmission with random phase shifts or changes in frequency to achieve the wide band width characteristics of noise. But the periodic transmissions are relatively easy to intercept using correlation type receivers called chip rate detectors. These receivers detect the periodic chip rate characteristic of current military signals.

What is needed is a secure LPI communications device and method that will reliably communicate with less than a complete signal transmission being received, avoid periodic signals and have the characteristics of random noise including a wide bandwidth and a noise-like waveform. It should also be capable of code word synchronization within a fraction of a second.

SUMMARY OF THE INVENTION

The principal and secondary objects of the invention are:
  to provide a secure and covert spread spectrum signal for data communications transmission which may be rapidly despread (codewise) and demodulated to reveal the data signal;
  to provide multiple channels of data transmission and reception capability in short "burst" transmissions:
  to provide recovery of the data signals from incomplete reception of transmissions; and
  to provide a communication means which uses pseudo-noise codes for spectrum spreading and security, but which does not require extensive synchronization with the pseudo-noise code signal or "word" at the receiver.

These and other objects are achieved in a holographic type of encryption, by encrypting a time dependent data signal, s(t), by a complex (real and imaginary) time dependent phase shifting signal, combined with a pseudo random noise signal of a type represented by $e^{iq(t)}$, producing a new signal which has widely spread the frequency of the data signal. This new complex signal is mathematically transformed, using a Fourier transform (or a transform of like properties) producing an amplitude and phase spectrum (or a real and imaginary spectrum) of signal components. The amplitude and phase spectrums (or real and imaginary spectrum) are themselves signals which are modulated into one or more radio frequency carriers (or some other radiating source, such as sound or light) as quadrature components and transmitted. At the receiver, the carriers are removed and quadrature signals are separated into real components and related imaginary components which are then mathematically inverse transformed (using the Fourier Transform, for example). The result is a complex signal with a real and imaginary components. This signal is phase demodulated, the complex conjugate of the transmitter's phase modulating signal producing a new signal X'(t) which is an accurate representation of the original data signal s(t) if a complete signal is recovered. If a partial signal (only a portion of the signal transmission) is recovered, X'(t) is still a representation of the data signal s(t), but may have spurious artifacts in the signal caused by the original phase modulation/transformation/transmission and a lack of portions of the transmitted signal not received. The signal X'(t) may then be filtered to remove these artifacts, recovering the reconstructed data signal, R(t).

BRIEF DESCRIPTION OF THE DRAWINGS

FIG. 1 shows a block diagram of a prior art secure communications system transmitter for direct sequence radio communications;

FIG. 2 shows a block diagram of a prior art secure communications system receiver for direct sequence radio communications;

FIG. 3 shows a block diagram of the transmitter portion of a holographic type communications system;

FIG. 4 shows a block diagram of the receiver portion of a holographic type communications system;

FIGS. 5a–5b shows graphical representations of four data signals;

FIG. 6 shows an enlarged view of the four data signals;

FIG. 11 shows the received and demodulated signal with a 50 percent loss; and

FIG. 12 shows the received and demodulated signal with a 75 percent loss.

DESCRIPTION OF THE PREFERRED EMBODIMENT

Figures 7, 8:
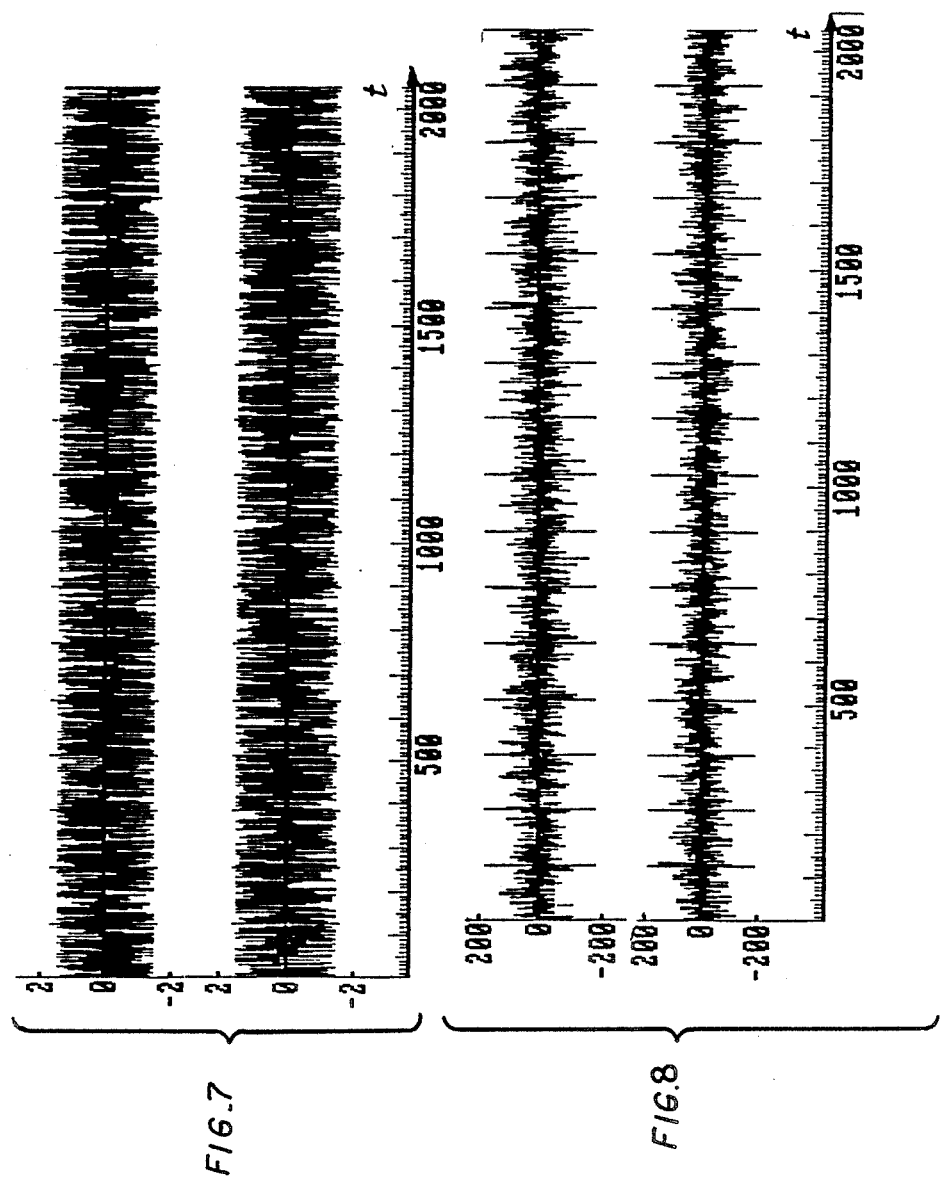
FIG. 7 shows an enlarged view of the four data signals.
FIG. 8 shows the real and imaginary transformed spread spectrum signals.

FIG. 1 shows a block diagram of a prior art secure communications system transmitter. Data signal generator 2 provides a time dependent data signal, represented by s(t). The data signal, s(t) is input into a baseband modulator or encryptor 3. The baseband modulator converts the data signal, s(t), into a Phase Shift Keyed (PSK) signal e(t) by combining e(t) with a pseudo-noise "word" or signal from a pseudo-noise generator 4. A carrier frequency tone from carrier frequency 6 is modulated by the transmitter 5 to produce a varying spread frequency spectrum signal which appears to be (and may actually be recorded) noise. The transmission system shown in FIG. 1 produces a noise-like time dependent and encrypted signal, f(t), sent to the RF transmitter or transmitting means 7.

FIG. 2 shows a block diagram of a prior art secure communications system receiver. Receiving antenna 8 recovers a signal, f'(t), which is similar to the transmitted signal, f(t). The signal f'(t) is amplified by a mixing operation with a carrier frequency in the RF receiver 9. The recovered time dependent signal, f'(t), from receiver 9 (similar to encrypted signal f(t) in FIG. 1), is input into a decipher unit 10 which de-encrypts (removes the pseudo noise signal) f'(t) using a pseudo noise generator similar to FIG. 1 to produce a time dependent signal, R (t), similar to the base band modulated time dependent signal, s(t) from FIG. 1.

The data signal representation s'(t) similarities to the data signal, s(t), depend upon the fidelity of the signal output from transmitter 5 and antenna 7 (shown in FIG. 1), the signal fidelity received at of the receiving antenna 8, demodulation at receiver 9 and synchronization at the decipher device 10. Any loss in fidelity is in addition to jamming or other losses between antennas 7 and 8.

FIG. 3 shows a block diagram of the preferred embodiment transmission portion of a holographic communications device and method. In essence, the idea is to "phase scramble" (modulate) the single frequency or narrow band width data signal or signals. This process is analogous to the holographic diffusion of a single laser frequency signal by means of a ground glass. The spread spectrum signals is transformed into real and imaginary components (or phase and amplitude component signals) by a Fourier transform or related process (similar to diffraction and propagation of a single frequency laser radiation from an object to be holographed), and Finally, the separate real and imaginary components (which comprise the hologram) are broadcast on disjoint frequency bands.

The preferred embodiment of the invention is designed t transmit simultaneously two independent digital data signal(s), $s_1(t)$ and $s_2(t)$, which are represented by two signal generators 2. Alternate embodiments may provide from one to four data channels. Signal $s_1(t)$ is assigned to the real channel and $s_2(t)$ is assigned to the imaginary channel. These data or information sources are typically in the form of a low frequency (under 16 KBS) series of digital pulses over a period of time called a frame. In the preferred embodiment, these frames are of 1 millisecond duration and are produced consecutively. Any information or data that was originally in an analog form (such as voice or compressed video), is first converted into a digital form for use by generator 2. Each of the time dependent data signals $s_1(t)$ and $s_2(t)$ passes through a baseband modulator 3 where it is converted into a bipolar square waves. A positive part of the square wave corresponds to a binary one. The negative part correspond to a binary zero. The time dependent square wave signals $X_r(t)$ and $X_i(t)$ produced by modulators 3 are also called zero-frequency, phase-shift-keyed (PSK) signals and form the two channels (real and imaginary channels) of a complex time dependent signal called X(t), where $X(t) = X_r(t) + iX_i(t)$. If four data signals are to be transmitted, the signals are also called zero frequency quadrature phase-shifted-keyed (QPSK) signals.

The two components of the complex signal, X(t) are phase modulated in an encoder 14 by a pseudo random code signal $e^{iq(t)}$, produced by a pseudo noise generator 15. The coverture imparted by the pseudo random signal may not be required in all applications, but is shown in the preferred embodiment. The encoder 14 is represented as a complex multiplier and has a time dependent output which is the complex product signal M(t), where $M(t) = X(t) e^{iq(t)}$. In the preferred embodiment q(t) is a time dependent series of pseudo random, uniformly distributed numbers having values between $-pi$ and $+pi$. M(t) is a series of pseudo random numbers having a zero-mean and uniform amplitude distribution. The frequency bandwidths of M(t) is at least 1000 times the bandwidth of the signal X(t) and depends upon the rate at which the pseudo random numbers are produced, i.e., the greater the rate, the greater the bandwidth. The bandwidth of M(t) is called the "code spread bandwidth".

The modulated, time dependent signal, M(t), is then input to a transformer, 16 using a Fourier transform, which can be implemented with a discrete Fast Fourier Transform (FFT) device. The transformer converts the phase modulated or encoded signal M(t) into a real time dependent component, $y_r(t)$, and an imaginary time dependent component, $y_i(t)$ which are the real and imaginary coefficients of the FFT process. $Y_r(t)$ and $Y_i(t)$ are each a time dependent series of data frames consisting of pseudo random numbers with a zero-mean Gaussian amplitude distribution and a rate identical to that of M(t). Frame times are identical to that of the signals coming from the generators 2. Other embodiments may use other transforms, such as orthogonal transforms (e.g., Hadamard or a chirp $-Z$ or a number theoretic).

The data signals, $Y_r(t)$ and $y_i(t)$, are converted by a digital to analog (D/A) converter 17a to provide the inputs to a conventional radio frequency (RF) transmitter 17. The transmitted signal in the preferred embodiment consists of frame of time dependent data over non-overlapping frequency bands obtained by modulating $Y_r(t)$ and $Y_i(t)$ onto two carriers of frequencies f1 and f2 produced by first and second oscillators 18 and 19. The RF modulated signals are combined (added together) and then carried to the transmitting antenna 7. The transmitter 17 uses linear amplifiers with sufficient bandwidth to handle the Gaussian amplitude statistics of the input signals. Significant amplitude distortion produced by transmitter 17 may be tolerated due to the inherent phase modulation immunity to such distortions.

The encrypting unit 3 of the prior art (FIG. 1) has been replaced by the encoder 14 and Fourier transformer 16. Alternately, other phase modulation relationships, Surface Acoustic Wave (SAW) and/or chirp transformers could have been used. Additionally, the use of analog devices may allow higher data capacity with wider spread bandwidths and may be smaller in size and weight compared to the digital implementation shown in the preferred embodiment.

The transmitted signal is the one dimensional hologram of the phase encoded data signals M(t). It is comparable to the two dimensional laser holograms produced with diffuse illumination. It is "covert" because it has noise-like Gaussian amplitude statistics over a wide bandwidth and is totally devoid of the clocked signals and "chips" produced by the prior art systems. Like the laser hologram, it is also highly information-redundant because the high bandwidth, phase encoder (a multiplier) combined with the FFT has spread the small bandwidth, data signal information (the Fourier transform "convolution" theorem for 2 signals multiplied in the time domain). Any piece of the transmitted hologram frame chosen at random (as small as 5%) may theoretically be used to retrieve the entire data signal frame. This level of redundancy is not found in the prior art. Additionally, data signal information is also spread evenly over the two frequency bands. The real and imaginary signal components, $Y_r(t)$ and $Y_i(t)$, contain identical information about the data signals. Loss of either frequency band to interference only slightly affects the receiver function, and does not significantly hinder the recovery of the entire transmitted data messages $S_1(t)$ and $S_2(t)$, except for a 3 DB loss in the signal to noise ratio.

FIG. 4 is a block diagram of the preferred embodiment of a holographic communications receiving device and method. In essence, the receiver retraces the steps of the transmitter with the addition of the frame lockup module 24 and filters 25. Signals from the receiving antenna 20 are fed to the RF receiver 21. Both the antenna 20 and receiver 21 are similar to the prior art antenna 8 and receiver 9 shown in FIG. 2, with the exception that the receiver has two channels to receive the disjoint frequency bands produced by the transmitter 17 of FIG. 3 and the antenna is of wider bandwidth to receive both bands.

The receiving antenna and receiver 21 need not faithfully receive all of the frequencies transmitted from the transmitter 17 shown in FIG. 3 or all of the time information within a hologram frame, but only a significant portion. This is because "pieces" of the original data signal are transmitted over many frequencies and at many different times during a frame period as previously discussed. This feature of the holographic communications may be of significant importance for burst communications in the presence of hostile jamming or interference where parts of the frame are lost or portions of the frequency bands are disrupted or missing.

The output of the receiver 21 is mixed down to the original spread bandwidths and baseband frequencies by mixer 22 using local oscillators at frequencies f1 and f2 from oscillators 18 and 19 corresponding to the oscillators 18 and 19 of the transmitting station shown in FIG. 3. The two analog outputs of the mixer 22, representing the real and imaginary channels of the received hologram, are converted to digital numbers using the analog to digital (A/D) converter 28 to produce the complex and time dependent digital signal $Y'(t-T) = Y_r'(t-T) + iY_i'(t-T)$. $Y'(t-T)$ is then passed through the inverse Fourier transform 23. The quantity T is the unknown transit time delay between transmitter and receiver. Transformer 23 uses exactly the same frame size and transformation rate as the Fourier transformer 16 in FIG. 3 but is not in frame registration due to the unknown time delay T.

The output G(t') of the inverse Fourier transformer 23 is equal to $M(t')e^{(i2[pi]Tt')}$, where $M(t') = X(t')e^{(iq(t'))}$. The signals X(t') and $e^{iq(t')}$ are not dependent on the delay time T. The signal G(t') may be despread (decoded) immediately by the complex conjugate phase code modulation provided by complex multiplier 14. In the preferred embodiment, the conjugate phase code signal is represented by the exponent -iq(t) and is produced by generator 27. The output of the decoder 14 is S'(t') S1'(t') +iS2'(t') which equals $X(t')e^{(iTt')}$. Since X(t') may represent PSK or QPSK signals, the frequency modulation caused by the exponent (i2[pi]Tt') can cause serious bit errors unless removed.

The removal of the frequency modulation exponent (i2[pi]Tt') is the function of the Frame Lockup module 24. It is in essence a power spectrum analyzer providing an accurate frequency measurement of the modulation tone represented by the exponent (i2[pi]Tt'). This frequency measurement sets a restart signal for the inverse Fourier transformer 23 and puts the transform process into frame registration by causing T to be equal to 0. The entire process of frame registration takes as little as one frame or one millisecond. This time is 2 to 4 orders of magnitude faster than the seconds or minutes normally required for code synchronization in the prior art. This feature makes the holographic communications particularly well suited for military communications where short transmission time (bursts) signals are involved. To facilitate this registration process, special data frames containing all ones may be periodically transmitted with known spreading codes q(t). The receiver then sees pure tones in module 24 and can register the frames even in the presence of 20 to 30 DB of added link interference.

This real signal reconstruction of the data signals is derived from only a portion of the frequency spectrum transmitted and may contain artifacts ("speckle" or false signals at certain frequencies) caused by the original phase modulation. The complex output of the frame lockup 24 consists of two time dependent signals which are low pass filtered by module 25 and then passed into baseband demodulators 26 which convert the PSK and QPSK signals into estimates (reconstructions) of the two original data signals R1(t') and R2(t'). Other embodiments may not require the filtering module 25, depending upon the type of transformation, frequencies received and quality of the recovered data required.

The decipher unit 10 of the prior art (FIG. 2) has been replaced by the inverse Fourier transformer 23 and decoder 14. Other embodiments may use other phase decoder relationships, Surface Acoustic Wave (SAW) and/or chirp inverse transformers for higher frequency data signals and spreading code signals matching the method used in the transmitter.

FIG. 5 illustrates graphs of the waveforms on the real and imaginary channels of the transmitter as they exit the baseband modulators 3 in FIG. 3 when QPSK modulation is used on each channel. $X_r(t)$ or the real channel is represented by the top graph while $x_i(t)$ or the imaginary channel is represented by the bottom graph. Each channel graph represents the result of multiplexing two real digital signals using QPSK modulation. A total of 4 independent data signals are thus being multiplexed onto the holographic signal. The QPSK waveforms representing pairs (i,j) of bits from two channels are illustrated in FIG. 5a, while the signal space representation of these 4 waveforms is shown in FIG. 5b. There are 64 data bits from 4 channels multiplexed onto the real and imaginary channels in a frame time of 1 millisecond. The horizontal axis of each graph reflects time where 2048 corresponds to 1 millisecond. The bit periods in the graphs are delineated by vertical lines every 128 data points or chips along the time axis.

FIG. 6 illustrates a time scale magnification of the signal shown in FIG. 5. The top half of the figure contains the "real" QPSK waveform containing data signals 1 and 2, and the lower half contains the "imaginary" QPSK waveform containing data signals 3 and 4.

FIG. 7 illustrates graphs showing the spread spectrum, time dependent signals as they exit the phase modulator (encoder) 14 in FIG. 3. By using a q(t) time dependent code signal that has values which vary between −pi and +pi in generator 15 of FIG. 3, the illustrated spread spectrum signals look like uniformly distributed white noise. The top graph portion represents the real channel and the bottom graph portion represents the imaginary channel.

FIG. 8 are graphs showing the real and imaginary time dependent signals (top and bottom portions respectively) representing the baseband hologram signal as it exits the Fourier transformer 16 in FIG. 3. The periodic vertical lines are part of the graphics display used for reference only and are not part of the hologram signal. These signals have the appearance of white Gaussian noise and a total absence of clock references and "chips" that are common to the prior art. Because of these characteristics, the hologram signals have a much higher degree of "covertness" or "stealth" compared to the signal outputs from the prior art.

Figure 9:
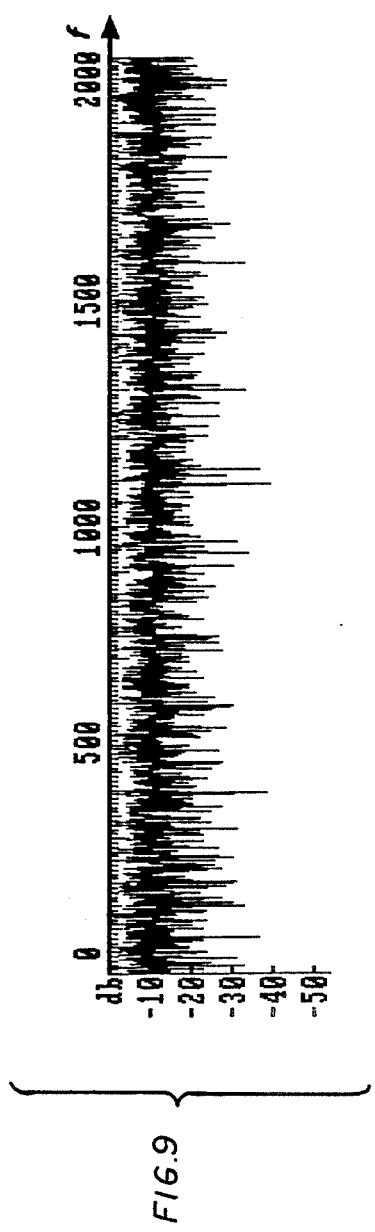
FIG. 9 shows the power spectrum transmitted signal.

FIG. 9 illustrates a graph showing the frequency power spectrum of the time dependent hologram signal shown in FIG. 8. The spectrum shows no artifacts or spectral lines, just a uniform distribution of energy across the bandwidth. The horizontal axis represents frequency. Peak frequency for the example is 1245.9 KHZ, where $f_1 = 1$ KHZ and $f_2 = 2.048$ MHZ (supplied by frequency generators 18 and 19 as shown in FIG. 18 and 19.

Figure 10:
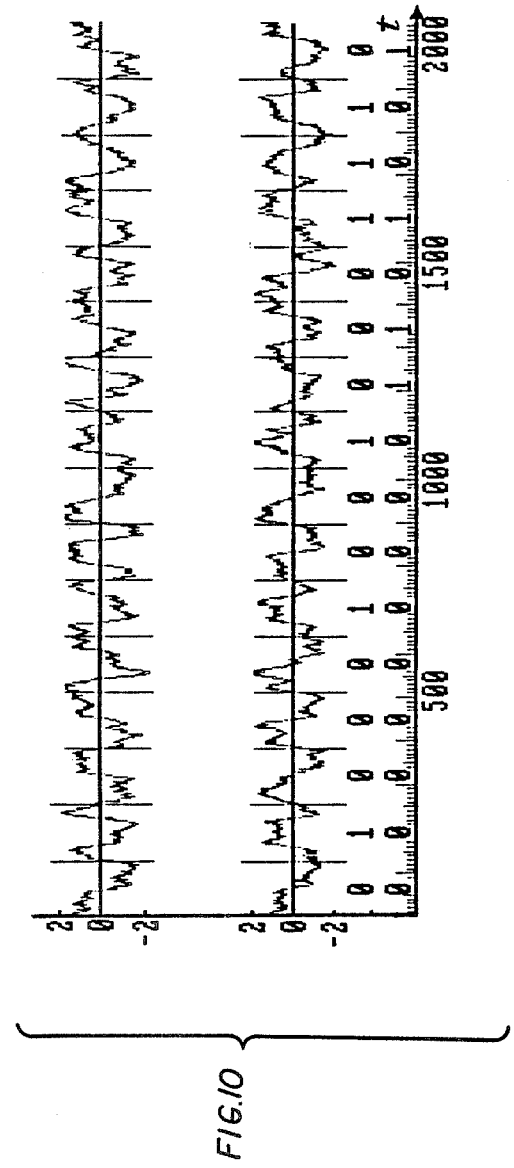
FIG. 10 shows the received and demodulated signal.

FIG. 10 illustrates graphs showing the receiver's estimation of the 2 QPSK signal channels (real and imaginary) after they exit the low pass filters 25 in FIG. 4. Bit periods are delineated by the periodic vertical lines on both graphs. $Y'_r(t')$ is represented by the top graph while $y'_i(t')$ is represented by the bottom graph. Each graph contains two data signals multiplexed together by the QPSK waveforms illustrated in FIG. 5. These graphs were obtained from the entire received hologram frame where zero-mean Gaussian link noise was added to the channels to produce a bit signal to noise ratio Eb/No=18 DB and s/n=0.7. The graphs illustrate that no data bits were received in error.

FIG. 11 illustrates graphs showing the receiver's estimation of the same 2 QPSK signal channels discussed and shown in FIG. 10, but after 50% of the holograms frame was lost. The graphs illustrate that no data bits were received in error.

FIG. 12 illustrates graphs showing the receiver's estimation of the same 2 QPSK signal channels as shown and discussed in FIG. 10, but after 75% of the hologram frame was lost. The graphs illustrate that no data bits were received in error.

While the preferred embodiment of the invention has been shown and described, changes and modifications may be made therein within the scope of the appended claims without departing from the spirit and scope of this invention.

What is claimed is:

1. In information communication systems wherein at a transmitting station, an information signal s(t) is encrypted by an encrypting unit, the resulting encrypted signal is applied to a carrier frequency in a modulator unit before the modulated frequency signal is transmitted to a receiving station where the modulated frequency signal is received, the received encrypted signal is extracted though a carrier frequency demodulation unit, then deciphered through a deciphering unit, the improvement of an holographic encrypting and deciphering system which comprises:

in said encrypting unit, means for modulating information signal s(t) by a complex time dependent code signal p(t) to create a complex pseudo-noise signal and means for transforming this pseudo-noise signal into another complex pseudo noise signal having a real spectral signal $y_r(t)$ and an imaginary spectral signal $y_i(t)$; and in said modulator unit, means for modulating the carrier frequency with said complex pseudo-noise signal having real and imaginary components.

2. The improvement claimed in claim 1, wherein said information signal is a phase-shift-keyed signal and said improvement further comprises means for multiplying said phase-shift-keyed signal X (t) with a pseudo random complex noise signal p(t) to create a another complex pseudo random frequency modulated signal M(t) for feeding said means for transforming.

3. The improvement claimed in claim 2, wherein said means for transforming comprises means for producing an orthogonal transform of said frequency modulated signal.

4. The improvement claimed in claim 3, wherein said orthogonal transform is a Fourier Transform.

5. The improvement claimed in claim 4, wherein said Fourier transform is a Fast Fourier Transform.

6. The improvement claimed in claim 5, wherein said means for multiplying comprises an encoder combining X(t) with pseudo random signal having an exponential form $e^{iq(t)}$.

7. The improvement claimed in claim 6, wherein said exponential form includes a periodic function of time.

8. The improvement claimed in claim 7, wherein the frequency bandwidth of M(t) signal is at least 1000 larger than the frequency bandwidth of X(t) signal.

9. The improvement claimed in claim 8, wherein said transform is a chirp transform.

10. The improvement claimed in claim 9, wherein said encrypting unit comprises means for modulating two data signals and to apply the resulting encrypted signals to two carrier frequencies.

11. The improvement claimed in claim 10, wherein said encrypting unit comprises means for quadrature modulating four data signals and to apply said resulting encrypted signals to two carrier frequencies 12. The improvement claimed in claim 11 which also comprises means to convert complex analog transformed signals to digital transformed signals prior to transmission.

13. In data communication systems wherein at a transmitting station, a time dependent signal, s(t), is encrypted by an encrypting unit, the resulting encrypted signal is applied to a carrier frequency in a modulator unit before the modulated frequency signal is transmitted to a receiving station where the receiver demodulates the carrier frequency through a demodulating unit and a received encrypted signal is extracted though a deciphering unit, the improvement of an holographic encrypting and deciphering system which comprises:

in said deciphering unit, means for inverse transforming said received demodulated signal by a complex phase signal p (t), to create a complex inverse transformed received signal y(t) having a real spectral signal component and an imaginary spectral signal component; and in said deciphering unit, means for frequency demodulating said complex inverse transformed received signal, demodulating said complex signal c'(t) with a time dependent phase demodulating signal producing a reconstructed data signal, r'(t).

14. The improvement claimed in claim 13, wherein said improvement also comprises a low pass filter connected to the output of said frequency demodulating means and filtering specific low frequencies from r'(t).

15. The improvement claimed in claim 14, wherein said means for inverse transforming comprises an fast Fourier transformer microprocessor.

16. The improvement claimed in claim 14, wherein said means for inverse transforming comprises a chirp transformer.

17. The improvement claimed in claim 14 which also comprises means for providing a frame lockup signal supplied to said inverse transforming means.

18. The improvement claimed in claim 17, wherein said means for frame lockup signal comprises a power spectrum analyzer outputting a start signal to said inverse transforming means.

19. The improvement claimed in claim 18 which also comprises means for converting received complex digital signals to complex analog signals prior to inverse transforming.

20. A communications method for the secure and covert transmission of coded electromagnetic signals containing information comprising the steps of:

(1) generating said electromagnetic information signal;

(2) modulating said information signal with a time dependent phase signal to create a frequency modulated signal;

(3) transforming said frequency modulated signal into a complex modulated signal having a real spectral signal component and an imaginary spectral component;

(4) further modulating said complex modulated signal with a carrier frequency signal to create a coded noise-like signal; and 5) transmitting said noise-like signal.

21. A communications method for the secure reception of transmitted noise-like coded complex electromagnetic signal containing information comprising the steps of:

(1) receiving spectral portions of said noise-like coded complex electromagnetic signal;

(2) demodulating said noise-like coded complex signal with a carrier frequency signal to create a coded complex signal;

(3) inverse transforming said coded complex signal into a complex modulated signal having a real spectral signal component and an imaginary spectral component; and (4) further demodulating said complex modulated signal with a time dependent phase signal to create a reconstructed information signal.

* * * * *